United States Patent
Kato

[19]
[11] Patent Number: 5,909,665
[45] Date of Patent: Jun. 1, 1999

[54] SPEECH RECOGNITION SYSTEM

[75] Inventor: Yasuko Kato, Tokyo, Japan

[73] Assignee: NEC Corporation, Tokyo, Japan

[21] Appl. No.: 08/864,914

[22] Filed: May 29, 1997

[30] Foreign Application Priority Data

May 30, 1996 [JP] Japan .................................. 8-136689

[51] Int. Cl.$^6$ .................................................. G10L 7/08
[52] U.S. Cl. .......................................... 704/241; 704/238
[58] Field of Search .................................... 704/231, 238, 704/239, 241, 254, 252, 236, 243, 200, 233, 244, 253, 250, 251, 255, 256

[56] References Cited

U.S. PATENT DOCUMENTS

| | | | |
|---|---|---|---|
| 4,256,924 | 3/1981 | Sakoe ...................................... | 704/241 |
| 4,587,637 | 5/1986 | Ishizuka .............................. | 365/189.04 |
| 4,592,086 | 5/1986 | Watari, et al. .......................... | 704/238 |
| 4,712,243 | 12/1987 | Ninomiya et al. ...................... | 704/248 |
| 4,742,547 | 5/1988 | Watanabe ................................ | 704/241 |
| 4,975,962 | 12/1990 | Oka ........................................ | 704/241 |
| 5,086,472 | 2/1992 | Yoshida .................................. | 704/255 |
| 5,121,465 | 6/1992 | Sakoe .................................... | 704/236 |
| 5,369,728 | 11/1994 | Kosaka et al. ......................... | 704/254 |

OTHER PUBLICATIONS

Basics of Human Speech, Lawrence Rabiner, Billing–Hwangjuang, translated by S. Furui, Nov. 1955, pp. 242 to 288 in section 4 and pp. 102 to 182 in section 6.

*Primary Examiner*—Richemond Dorvil
*Attorney, Agent, or Firm*—McGinn & Gibb, P.C.

[57] ABSTRACT

To construct an inexpensive speech recognition system, a speech recogntion system includes an analyzing unit for extracting a sound, sequentially dividing the sound into a plurality of frames, converting each of the frames sequentially to first data, and sequentially storing the first data to an input pattern memory, a distance calculating unit for reading a predetermined number of the first data from the input pattern memory, reading one of second data from a standard pattern memory, calculating first distances between each of the predetermined number of the first data and the one of the second data, and a judging unit for judging a word representing the sound based on the first distances.

32 Claims, 4 Drawing Sheets

SPEECH RECOGNITION SYSTEM

BACKGROUND OF THE INVENTION

The present invention generally relates to a speech recognition system, and more particularly to a speech recognition system having a distance calculating unit.

Description of the Related Art

Currently, many speech recognition methods for recognizing words from sounds of a conversation, are used. For example, a matching method and a hidden Markov model method (HMM) are described in "BASICS OF SPEECH RECOGNITION" (written by Lawrence Rabiner, Billing-Hwangjuang, translated by S. Furui, November 1995, pages 242 to 288 in section 4 and pages 102 to 182 in section 6, incorporated herein by reference).

Hereinafter, according to the description in "BASICS OF SPEECH RECOGNITION", only the matching method is described because the matching method and the HMM method (especially with using the Viterbi algorithm) are basically the same.

First, a sound of conversation (or speech) is sampled. The sound is sequentially divided into a plurality of frames (e.g., the number of frames is "I", where "I" is an integer), and then is converted into an input pattern "A" as shown in the following equation:

$$A = a1, a2, ---, aI \quad (1)$$

Then, the input pattern "A" is compared with a standard pattern "bj" ($1 \leq j \leq J$, wherein j and J are each an integer). For example, the standard pattern "bj" is a subword such as a syllable and/or a phoneme which is smaller than a word, as described in the "BASICS OF SPEECH RECOGNITION" (pages 247 to 260 in section 8 thereof, incorporated herein by reference). The standard pattern "bj" is called as "subword standard pattern".

Every time the feature "ai" ($1 \leq i \leq I$, wherein i is an integer) of the input pattern "A" is entered, the feature "ai" is compared with all of the subword standard patterns (e.g., b1, b2, ..., bJ) stored in a standard pattern memory, for calculating a difference between the feature "ai" and the subword standard pattern "bj". The difference is called a "distance". The distance between the feature "ai" and the subword standard pattern "bj" (e.g., d(i, j)) is calculated by the following equation:

$$d(i, j) = |ai - bj| \quad (2)$$

At this time, the number of times for accessing the standard pattern memory becomes "J" (wherein J is an integer) per each frame. Therefore, the total number of times for accessing the standard pattern memory becomes "I"×"J" (where I and J are each an integer) for the input pattern "A".

Then, the input pattern "A" is compared with many standard words having some of the subword standard patterns. The standard words are predetermined for recognizing words, and are stored in a dictionary memory. For example, one of the standard words "B" has a structure as follows:

$$B = b1, b2, ---, bJ \quad (3)$$

A distance D(A, B) between the input pattern "A" and the standard word "B" is calculated with an asymptotic-processing formula as shown in the following:
(initial setting)

$$g(1, 1) = d(1, 1) \quad (4)$$

$$g(i, 0) = \infty (i = 1, 2, ---, I) \quad (5)$$

(calculation)

$$g(i, j) = d(i, j) + \min[g(i-1, j), g(i-1, j-1)] \quad (6)$$

($i = 1, 2, ---, I$ and $j = 1, 2, ---, J$)
(the formula "min [a, b]" means using the value of "a" if the value of "a" is smaller than that of "b")
(distance between the input pattern "A" and the standard word "B")

$$D(A, B) = g(I, J) \quad (7)$$

The asymptotic-processing formula (6) is sequentially calculated for each grid point(s) based on an initial value of (1, 1) on the (i, j) plane shown in FIG. 1. The calculation result is stored into the accumulation value memory as an accumulation value g(i, j), every time the asymptotic-processing formula is calculated. Then, this stored calculation result is employed in the asymptotic-processing formula calculation at the next grid point. Another calculation result is stored into the accumulation value memory as a new accumulation value. Therefore, the operations for loading and memory as a new accumulation value. Therefore, the operations for loading and storing data g(i, j) in the accumulation value memory are performed J times per one frame.

Thereafter, if the dictionary memory stores standard words "B", "C", ... and "Z", the other distances D(A, C), ... and D(A, Z) are calculated similarly. Then, a standard word having the smallest value among the distances is selected as a result (e.g., the word most closely associated with the sound).

However, the above-described process must be performed typically within a predetermined time (e.g., a relatively short time), since the speech recognition result must be obtained immediately after the sound is inputted. When the number of words to be recognized increases, the above-described value of J increases, and further high-speed processing operations are required. To execute such high-speed processing operations, the loading/storing; operations for the standard pattern memory and for the accumulation value memory should be performed at high speed.

As a result, expensive memories must be utilized for achieving a high-speed operation since generally high-speed memories are more expensive than low-speed memories. This is a problem.

SUMMARY OF THE INVENTION

In view of the foregoing and other problems of the conventional structure, it is therefore an object of the present invention to provide an improved speech recognition system.

It is another object of the present invention to provide an improved speech recognition system having an improved distance calculating unit.

In a first aspect, a speech recognition system, according to the present invention, includes an analyzing unit for receiving a sound, sequentially dividing the sound into a plurality of frames, converting each of the frames sequentially to first data, and sequentially storing the first data to an input pattern memory, a distance calculating unit for reading a predetermined number of the first data from the input pattern memory, reading one of second data stored in a standard pattern memory, calculating first distances between each of the predetermined number of the first data and the one of the second data, and a judging unit for judging a word representing the sound based on the first distances.

With the unique and unobvious structure of the present invention, the distance calculating unit reads a predetermined number of the first data from the input pattern memory, and calculates first distances between each of the predetermined number of the first data and the one of the second data, and a word associated with the closest first distance is selected. Therefore, a less expensive speech recognition system can be formed because of a decreased number of times the distance calculating unit must access the standard pattern memory.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
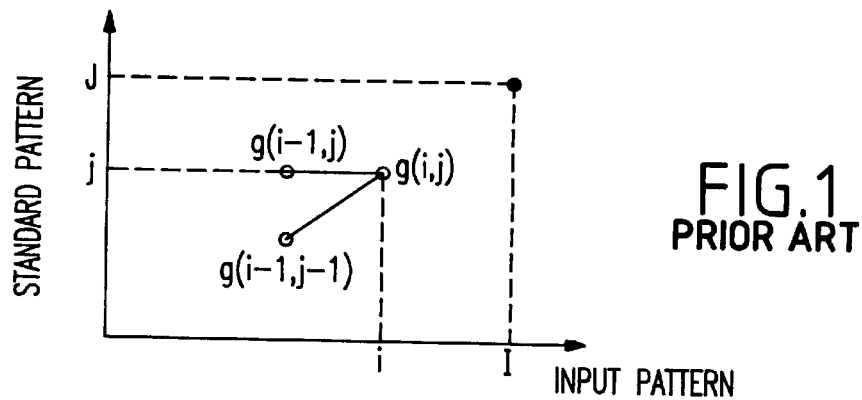
FIG. 1 illustrates a (i, j) plane for a conventional matching method.
Figure 2:
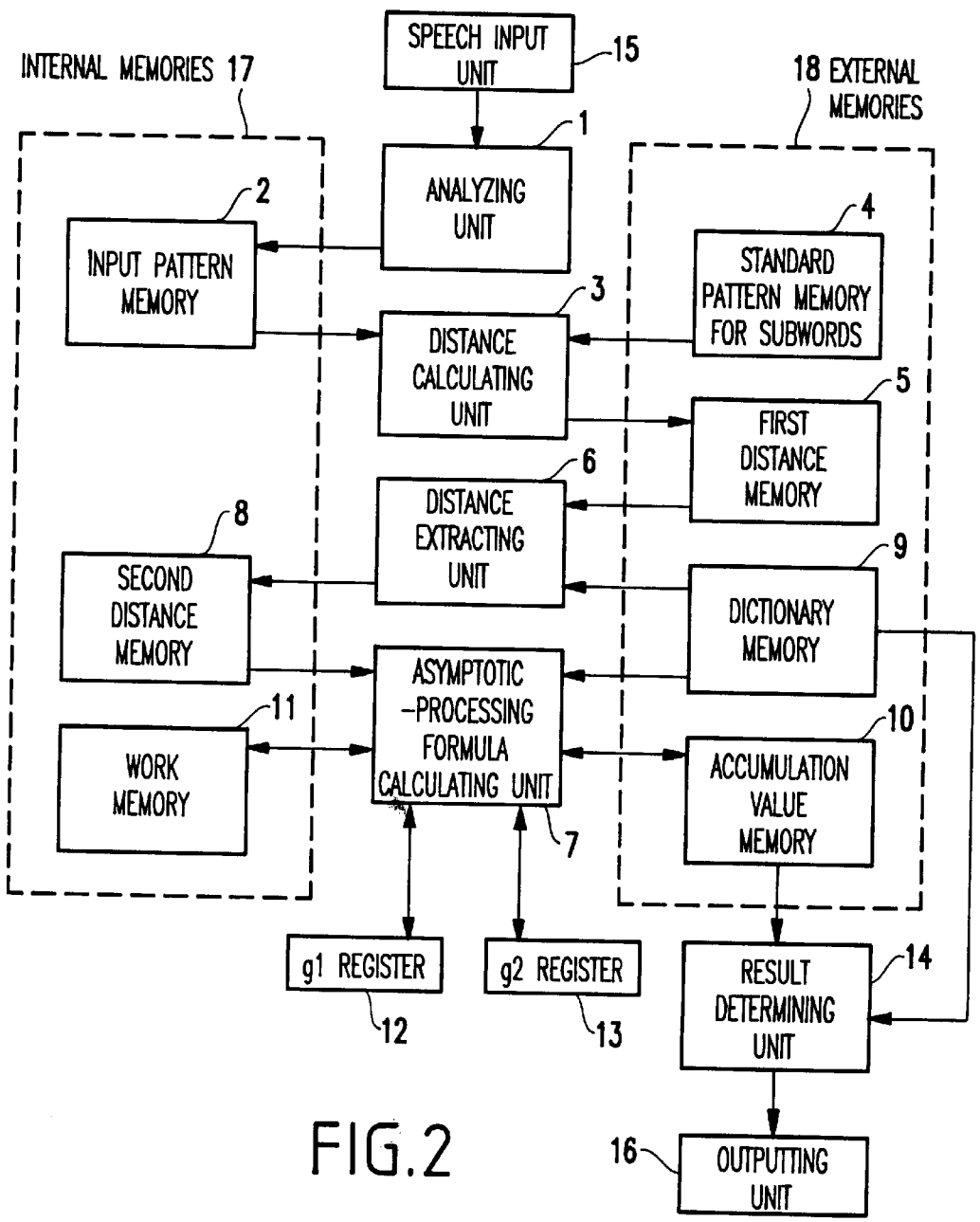
FIG. 2 is a diagram showing a speech recognition system according to the present invention.
Figure 3:
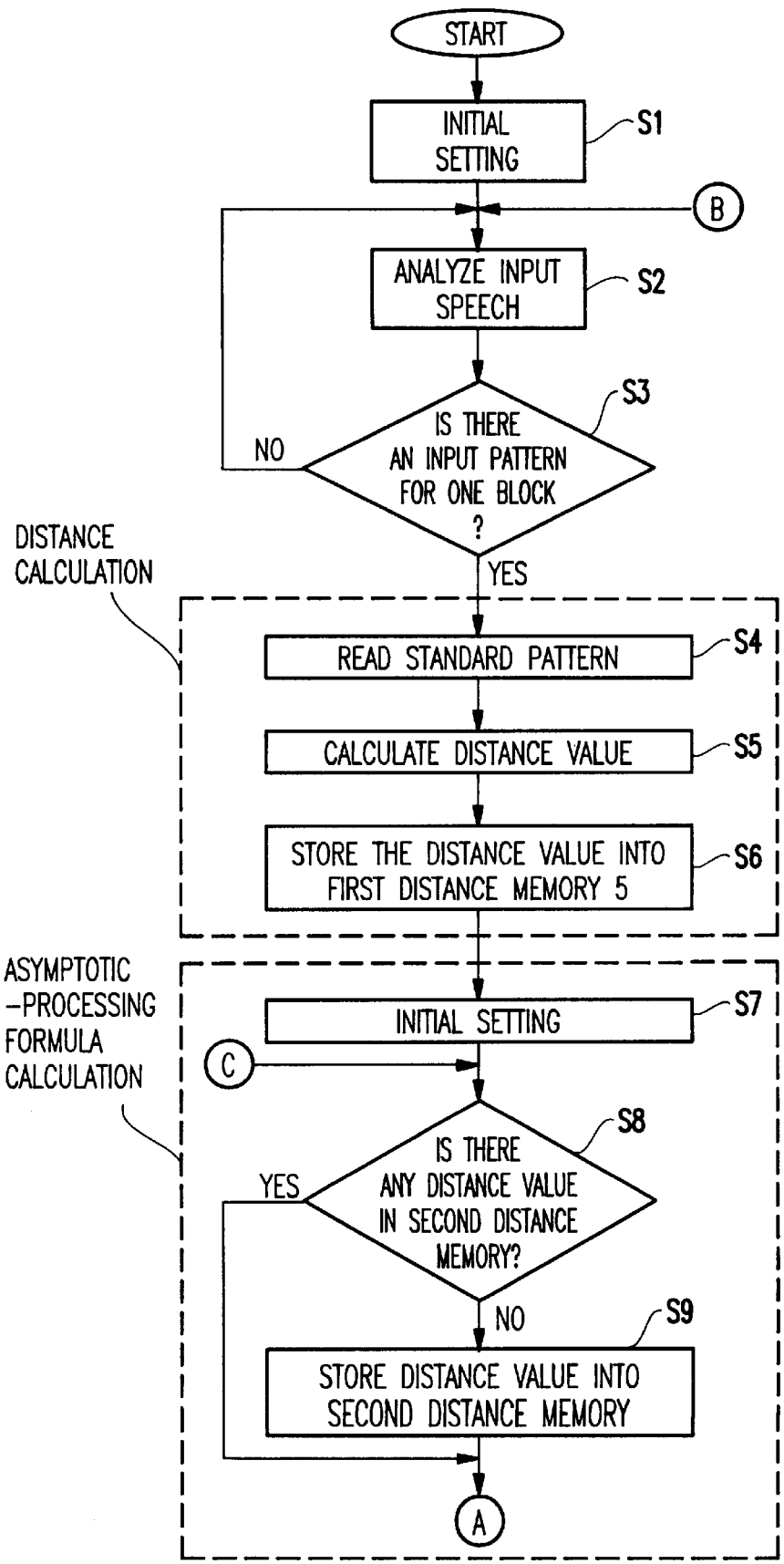
FIG. 3 is a flow-chart for explaining the speech recognition method employed by the system shown in FIG. 2.
Figure 4:
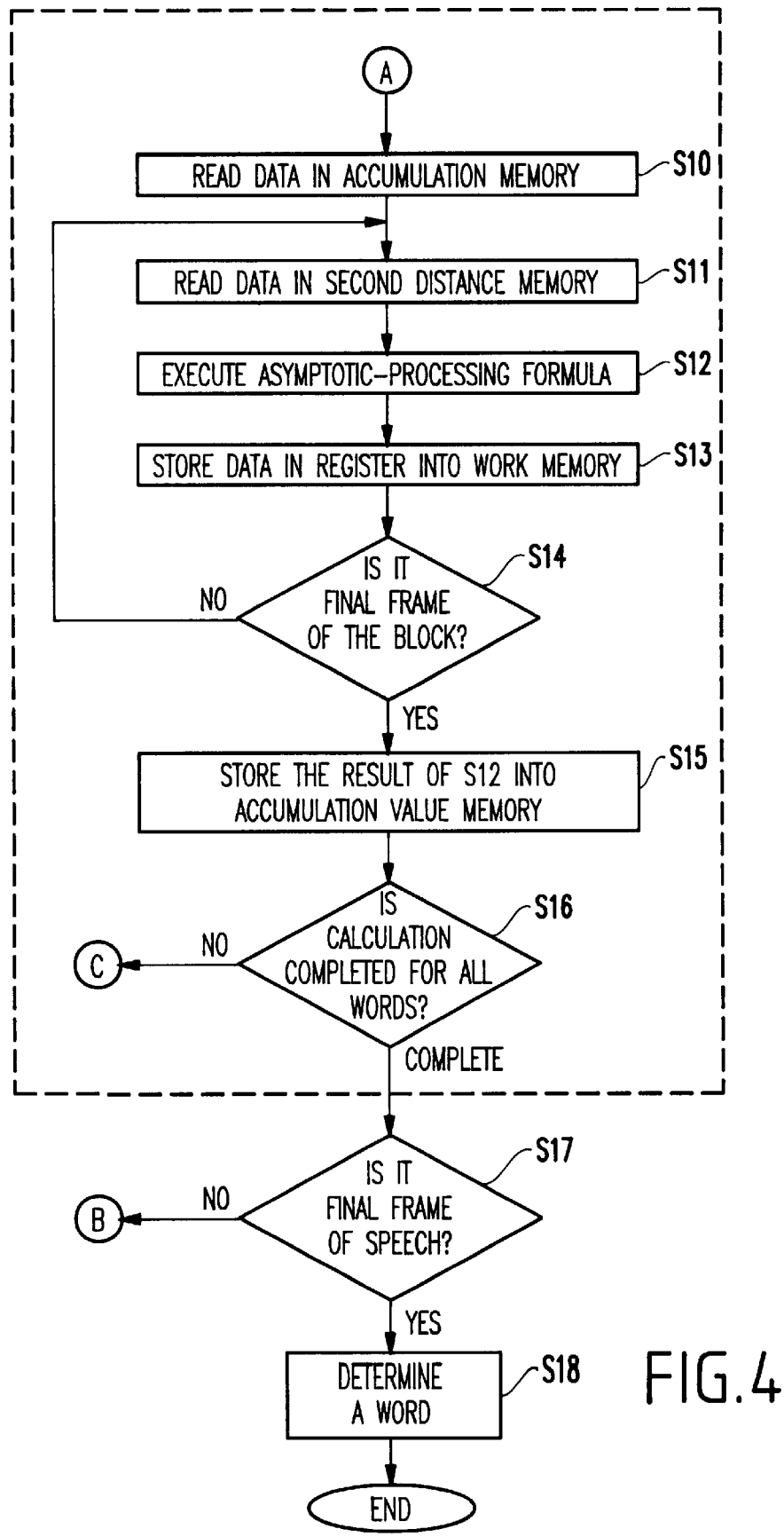
FIG. 4 is a further flow-chart for explaining the speech recognition method employed by the system shown in FIG. 2.

Referring now to the drawings, and more particularly to FIGS. 2–4, a speech recognition system is shown according to an embodiment of the present invention.

FIG. 2 is a block diagram illustrating a speech recognizing system which includes an analyzing unit 1, a distance calculating unit 3, a distance extracting unit 6, an asymptotic-processing formula calculating unit 7, a g1 register 12, a g2 register 13, a result determining unit 14, a speech input unit 15, internal memories 17 and external memories 18. FIG. 3–4 are flow-charts for describing a sequential process of the system shown in FIG. 2.

First, as shown in FIG. 3, an initial value is set (step S1). For example, infinity ("∞") is set as a value of g(0, j), and "0" is set as a value of g(0, 0) in an accumulation value memory 10 of the external memories 18. Also, "1" is set as an initial value of a starting frame "is" (where "is" is an integer). Then, the speech input unit 15 (e.g., a microphone, voice box, or other sound producing device) samples a sound of conversation (or speech).

Thereafter, the analyzing unit 1 extracts the sound, sequentially divides the sound into a plurality of frames (e.g., the number of the frames is "I" which is an integer), analyzes each frame sequentially with some analyzing method (e.g., MEL cepstrum analysis described in "DIGITAL SPEECH PROCESSING", T. KOGA published by TOKAI UNIVERSITY), and sequentially stores the analyzed data as a feature "ai" ($1 \leq i \leq I$, wherein i and I are an integer) to the input pattern memory 2 (step S2). Finally, an input pattern "A", as shown in the formula (1), is stored in the input pattern memory 2.

The distance calculating unit 3 extracts the features of the analyzed data when the input pattern memory 2 stores a predetermined number "IL" (e.g., a so-called "length of time block") of the features. For example, the distance calculating unit 3 extracts the features "a1", "a2", "a3" and "a4" simultaneously when the input pattern memory 2 stores the features "a1"–"a4" if the predetermined number "IL" is four. The distance calculating unit 3 does not access the input pattern memory 2 before the input pattern memory 2 stores the feature "a4" in this case (step S3). Similarly, the distance calculating unit 3 extracts the features "ais", - - -, "a(is+IL−1)" ("ais" represents a particular feature, e.g., if "is" is "1", then "ais" is "a1" in the description above).

The distance calculating unit 3 loads a subword standard pattern "bk" ($1 \leq k \leq K$, wherein k and K are each an integer) sequentially from the standard pattern memory 4 (step S4), because the standard pattern memory 4 stores all the subword standard patterns b1–bK. The subword standard pattern "bk" has the same character analyzed by the same analyzing method (e.g., MEL cepstrum analysis) as that of the feature "ai".

Then, the distance calculating unit 3 calculates a distance d(i, k)(step S5) in synchronization with the loading of each subword pattern "bk". The equation is as follows:

$$d(i, k) = |ai - bk| \tag{8}$$

(where i=is, - - -, is+IL−1; k=1, - - -, K)

For example, if the predetermined number "IL" is four, distances d(1, k), d(2, k), d(3, k) and d(4, k) are obtained, when the distance calculating unit 3 accesses the standard pattern memory 4 for loading the subword pattern "bk". Therefore, a number of accesses required by the distance calculating unit 3 to access the standard pattern memory 4 becomes ("I" x "K")/("IL").

Figure 5:
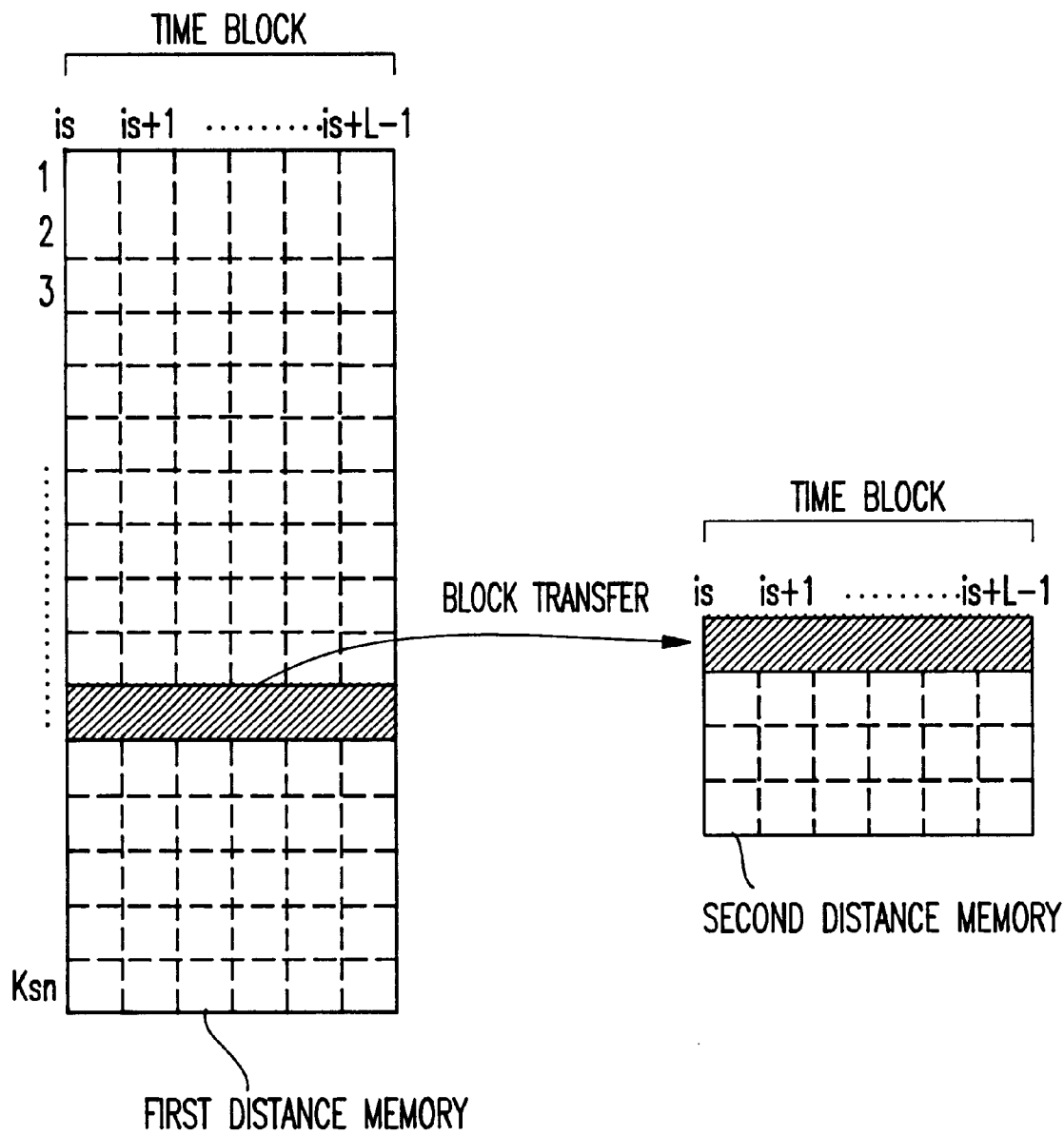
FIG. 5 is a diagram for showing a block transfer of data.

Thus, with the invention, the number of accesses required is 1/("IL") that of the conventional system and method. According to the above embodiment, the standard pattern memory need not be a high performance memory (e.g., high speed access) because the accessing number (number of accesses required) is much smaller than that of the conventional system. Then, the distances of a single time block (e.g., d(1, k), d(2, k), d(3, k) and d(4, k)) are stored in the first distance memory 5 (step S6). Similarly, each calculation operation and data storage operation are executed. At this time, the first distance memory 5 stores the distances of the single time block to the portion ksn ($1 \leq ksn \leq Ksn$ wherein ksn and Ksn are an integer), as shown in FIG. 5.

Next, based upon words W1, W2, - - -, Wn (where "n" is an integer) stored in the dictionary memory 9, the asymptotic-processing formula calculation is performed in the following sequence. Every word is constructed with the subword standard patterns. For example, a word W1 has subword series information {S1, S2, - - -, SN} (where "N" is an integer). The asymptotic-processing formula calculation sequence is described below and is as shown in FIGS. 3 and 4.

(1). First, an initial value is set (step S7). For example, an initial value of "∞" is set to g(i, 0)(where i=is, - - -, is+IL−1) stored in the work memory 11, and another initial value of "1" is set to "3" in the work memory 11.

(2). As to each of the words, the below-mentioned process operations defined by steps (3) to (11) are repeatedly executed for every subword, namely, less than N times of n=1, 2, - - -, N (step S16).

(3). With respect to a frame k' of frames k'=1, 2, - - -, KSn (where "KSn" is a total frame number of a standard pattern BSn) of the subword standard pattern BSn corresponding to the subword series information Sn, the below-mentioned process operations defined by steps (4) to (11) are repeatedly performed.

(4). The distance values d(is, k') to d(is+IL−1, k') for a single time block stored in the first distance memory 5 are transferred to the second distance memory 8 by the distance extracting unit 6 (steps S8, S9) by using the block transfer method shown in FIG. 5. At this time, when a cache memory is employed as the second distance memory 8, a judgment function defined at a step (8) can be executed by such a cache function that it is automatically judged whether necessary data is stored in the cache memory, and when this necessary data has been stored, the data stored in the cache memory is directly used.

(5). The asymptotic-processing formula calculating unit 7 loads the accumulation value g(is−1, j) from the accumulation value memory 10, and then stores the accumulation value into the g1 register 12 (step S10).

(6). As to the respective frames (i=is, - - - , is+IL−1) within a single time block, the asymptotic-processing formula calculating unit 7 repeatedly executes the following process operations defined by steps (7) to (9).

(7). The distance value d(i, k') is read out as d(i, j) from the second distance memory 8 (step S11). The asymptotic-processing formula calculation defined by formula (6) is executed by employing g(i−1, j−1) saved in the work memory 11 and g(i−1, j) saved in the g1 register 12, and the calculated value g(i, j) is saved in the g2 register 13 (step S12).

(8). g(i−1, j) corresponding to the content of the g1 register 12 is stored A as g(i−1, j−1) into the work memory 11 (step S13).

(9). g(i, j) corresponding to the content of the g2 register 13 is stored into the g1 register 12.

(10). After the final frame of the time block has been processed as determined in step S14, g(is+IL−1, j) corresponding to the content of the g1 register 12 is stored into g(is, j) of the accumulation value memory 10 (step S15).

(11). Then, the contents of g1 register 12 is counted up to j=j+1.

When the above-described asymptotic-processing formula calculation is accomplished for all of the words stored in the dictionary memory 9 (as determined in step S16), the accumulation value calculation starting frame is set to is=is+IL and the process proceeds to step S17 to determine whether the frame constitutes the final frame of the speech. If the calculation is not completed for the words, the process operation returns to step S2.

When the process operation is completed up to the speech occurrence end frame i=I (step S17), one word in the dictionary memory is outputted as the recognized word (e.g., W1) by the result determining unit 14. This word W1 has the smallest value among the accumulation values of the end frame of the word stored in the accumulation value memory 10 (step S18).

Thus, the words contained in the speech can be recognized in accordance with the above-described sequential operation.

It should be noted that high-speed operations are not required for the subword standard pattern memory 4, the first distance memory 5, the dictionary memory 9, and the accumulation value memory 10 but these memories do require relatively large memory capacities. Thus, these memories are connected as external memories 18 to a microprocessor containing other main components.

On the other hand, since the input pattern memory 2, the second distance memory 8, and the work memory 11 can have relatively small memory capacities and are operated at high speed, these memories are built-in to the microprocessor (e.g., internal memories).

It should also be noted that although the input pattern memory 2, second distance memory 8, and work memory 11 may be arranged preferably as the internal memory of the microprocessor without deteriorating the high-speed operations thereof, a high-speed memory may be employed instead of these memories and may be provided outside the microprocessor. Also, the distance value data are transferred from the first distance memory 5 to the second distance memory 8 in the block transfer manner in the distance extracting unit 6.

For example, as shown in FIG. 5, a single time block transfer manner is employed as this block transfer operation. According to this block transfer operation, as indicated in FIG. 5, since the distance value data defined from the frame "is" to the frame "is+IL−1" within a single time block are transferred from the first distance memory 5 to the second distance memory 8 in the batch form simultaneously, the processing operation can be executed at high speed.

In the above-described embodiment, the path {g(i−1, j−1), g(i−1)} is utilized in the matching method executed in the asymptotic-processing formula calculation. Alternatively, other paths may be employed. For instance, the path {g(i−1, j−2), g(i−1, j−1), g(i−1, j)} may be employed in the matching method.

Instead of the matching method, the method using HMM also may be employed. In this case, the equations indicated in "BASICS OF SPEECH RECOGNITION" (pages 126 to 128 in section 6) are used instead of the above-described equations (3) to (7), and the present invention could be suitably and easily modified as would be known by one of ordinary skill in the art within the purview of the present specification.

As previously described, in accordance with the present invention, the time required for the speech recognition process operation can be reduced by utilizing a high-speed memory with a low memory capacity even when a memory operated at relatively low speed is employed.

Specifically, in the present invention, the speech recognition process operation is performed in units of the time block. At this time, the distance calculation is performed in units of the subword standard pattern, and the resultant distance values are transferred in units of the time block to the memory with a high-speed read/write operation. In the asymptotic-processing formula calculation, the distance value is read out from this memory with the high-speed read/write operation. Consequently, the process operation executed by using a low-speed memory can be accomplished quickly.

The cost of the high-speed memory is relatively high. Since the expensive high-speed memories are required less than in the conventional system, the speech recognizing apparatus can be made inexpensive. Furthermore, since a small number of high-speed memories are employed, the memory can be easily assembled into the microprocessor. Therefore, the overall size of the speech recognition apparatus can be reduced.

While the invention has been described in terms of a preferred embodiment, those skilled in the art will recognize that the invention can be practiced with modification within the spirit and scope of the appended claims.

Having thus described my invention, what I claim as new and desire to secure by Letters Patent is as follows:

1. A speech recognition system, comprising:
   an analyzing unit for receiving a sound, sequentially dividing the sound into a plurality of frames, and converting each of the frames sequentially to first data;
   an input pattern memory for sequentially storing the first data;

a distance calculating unit for reading a predetermined number of the first data from said input pattern memory;

a standard pattern memory for storing second data, said distance calculating unit for reading one of said second data, and for calculating first distances between each of the predetermined number of the first data and the one of the second data; and a judging unit for calculating an asymptotic-processing formula based on the first distances, and for judging a word representing the sound based on a result of a calculation of said asymptotic-processing formula.

2. The system as recited in claim 1, further comprising:
a first distance memory for storing the first distances; and
a distance extracting unit for reading a predetermined number of the first distances from said first distance memory using a block transfer mode, and outputting the predetermined number of the first distances to said judging unit.

3. The system according to claim 1, wherein said plurality of frames are stored in said input pattern memory as a time block.

4. The system according to claim 1, wherein said distance calculating unit extracts features of the analyzed data when the input pattern memory stores a predetermined number of the features, said predetermined number being a time block.

5. The system according to claim 4, wherein said distance calculating unit extracts the features simultaneously when the input pattern memory stores the features.

6. The system according to claim 5, wherein said distance calculating unit accesses the input pattern memory only after the input pattern memory stores a last feature of the predetermined number of the features.

7. The system according to claim 1, wherein a number of accesses required by said distance calculating unit to access said standard pattern memory is $(I \times K)/(IL)$, where I is an integer and is a number of frames of said plurality of frames, K is an integer representing a total number of subword standard patterns stored in said standard pattern memory, and IL is a predetermined number of features of the plurality of frames.

8. A speech recognition system, comprising:
an analyzing unit for receiving a sound, sequentially dividing the sound into a plurality of frames, and converting each of the frames sequentially to first data;

an input pattern memory for sequentially storing the first data;

a distance calculating unit for reading a predetermined number of the first data from said input pattern memory;

a standard pattern memory for storing second data, said distance calculating unit for reading one of said second data, and for calculating first distances between each of the predetermined number of the first data and the one of the second data; and a judging unit for judging a word representing the sound based on the first distances;

a first distance memory for storing the first distances;

a distance extracting unit for reading a predetermined number of the first distances from said first distance memory using a block transfer mode, and outputting the predetermined number of the first distances to said judging unit; and a dictionary memory, coupled to said distance extracting unit, for storing words, wherein said judging unit comprises:

a second distance memory for receiving the predetermined number of the first distances from said distance extracting unit and storing the predetermined number of the first distances;

an asymptotic-processing formula calculating unit for calculating an asymptotic-processing formula based on the first distances stored in said second distance memory and said words stored in said dictionary memory; and a result determining unit for judging the word closest associated with the sound, based on a result of a calculation of said asymptotic-processing formula.

9. The system as recited in claim 8, wherein said input pattern memory and said second distance memory each output data faster than each of said standard pattern memory, said first distance memory, and said dictionary memory.

10. The system as recited in claim 9, wherein said input pattern memory and said second distance memory comprise memories internal to a microprocessor.

11. The system as recited in claim 10, wherein said standard pattern memory, said first distance memory, and said dictionary memory comprise memories external to said microprocessor.

12. The system as recited in claim 11, wherein said second distance memory comprises a cache memory.

13. A speech recognition system for use with a standard pattern memory and a first distance memory comprising:
a sound receiving unit for receiving a sound, converting the sound to a plurality of first data, calculating first distances between each one of the first data and one of second data stored in the standard pattern memory, and storing the first distances to the first distance memory;

a distance extracting unit for reading the predetermined number of the first distances stored in said first distance memory by using a block transfer mode; and a judging unit for calculating an asymptotic-processing formula based on the first distances read by said distance extracting unit, and for judging a word representing the sound based on a result of a calculation of said asymptotic-processing formula.

14. The system as recited in claim 13, further comprising an input pattern memory coupled to said sound receiving unit, wherein said sound receiving unit comprises:
a speech input unit for sampling the sound;

an analyzing unit for extracting the sound from said speech input unit, sequentially dividing the sound into a plurality of frames, converting each of the frames sequentially to the first data, and sequentially storing the first data to said input pattern memory; and a distance calculating unit for reading a predetermined number of the first data from said input pattern memory, reading one of the second data from said standard pattern memory, and calculating first distances between each of the predetermined number of the first data and the one of the second data.

15. A speech recognition system for use with a standard pattern memory and a first distance memory comprising:
a sound receiving unit for receiving a sound, converting the sound to a plurality of first data, calculating first distances between each one of the first data and one of second data stored in the standard pattern memory, and storing the first distances to the first distance memory;

a distance extracting unit for reading the predetermined number of the first distances stored in said first distance memory by using a block transfer mode; and a judging unit for judging a word representing the sound based on the first distances read by said distance extracting unit;

an input pattern memory coupled to said sound receiving unit, wherein said sound receiving unit comprises:

a speech input unit for sampling the sound;

an analyzing unit for extracting the sound from said speech input unit, sequentially dividing the sound into a plurality of frames, converting each of the frames sequentially to the first data, and sequentially storing the first data to said input pattern memory; and a distance calculating unit for reading a predetermined number of the first data from said input pattern memory, reading one of the second data from said standard pattern memory, and calculating first distances between each of the predetermined number of the first data and the one of the second data; and a dictionary memory coupled to said distance extracting unit, wherein said judging unit comprises:

a second distance memory for receiving the predetermined number of the first distances from said distance extracting unit and storing the predetermined number of the first distances;

an asymptotic-processing formula calculating unit for calculating an asymptotic-processing formula based on the first distances stored in said second distance memory and words stored in a dictionary memory; and a result determining unit for judging the word associated with the sound based on a result of a calculation of said asymptotic-processing formula.

16. The system as recited in claim 15, wherein said input pattern memory and said second distance memory each output data faster than said standard pattern memory, said first distance memory, and said dictionary memory.

17. The system as recited in claim 16, wherein said input pattern memory and said second distance memory comprise memories internal to a microprocessor.

18. The system as recited in claim 17, wherein said standard pattern memory, said first distance memory, and said dictionary memory comprise memories external to said microprocessor.

19. The system as recited in claim 18, wherein said second distance memory comprises a cache memory.

20. A speech recognition system comprising:

a subword standard pattern memory for previously storing standard patterns formed in a unit of a subword;

an analyzing unit for analyzing inputted speech in a unit of a frame to thereby obtain input patterns corresponding to time sequences of features of the inputted speech;

an input pattern memory for storing said input patterns obtained in said analyzing unit;

a distance calculating unit for calculating a distance between said input pattern and said standard pattern in each frame in a unit of a time block while said input patterns of a plurality of frames are combined together to form a single time block;

a first distance memory for storing the distance value in said unit of said time block calculated in said distance calculating unit;

a second distance memory for reading/writing data at a speed higher than that of said first distance memory, for accepting a transfer of the distance value in said unit of said time block calculated in said distance calculating unit to store the transferred distance value;

a dictionary memory for storing information related to a word to be recognized;

an accumulation value memory for storing an accumulation value of the distances;

an asymptotic-processing formula calculating unit for calculating a new accumulation value of the distances in said unit of said time block based on information related to said word to be recognized stored in said dictionary memory, said distance value stored in the second distance memory, and said accumulation value stored in the accumulation value memory; and a recognition result determining unit for determining a recognition result based on the accumulation value of the distance stored in said accumulation value memory.

21. The system as recited in claim 20, further comprising a distance extracting unit for extracting a distance value in said unit of said time block from said first distance memory based on said information held in said dictionary memory, and block-transferring the extracted distance value in said unit of said time block to said second distance memory.

22. The system as recited in claim 21, wherein said second distance memory comprises a cache memory.

23. The system as recited in claim 20, wherein both said input pattern memory and said second distance memory comprise memories operable at a speed higher than that of said first distance memory.

24. The system as recited in claim 23, wherein said second distance memory comprises a cache memory.

25. A speech recognition system, comprising:

an analyzing unit for receiving a sound, sequentially dividing the sound into a plurality of frames, and converting each of the frames sequentially to first data;

an input pattern memory for sequentially storing the first data;

a distance calculating unit for reading a predetermined number of the first data from said input pattern memory;

a standard pattern memory for storing second data, said distance calculating unit for reading one of said second data, and for calculating first distances between each of the predetermined number of the first data and the one of the second data; and a judging unit for judging a word representing the sound based on the first distances, wherein said plurality of frames are stored in said input pattern memory as a time block, and wherein said distance calculating unit extracts the features of the analyzed data when the input pattern memory stores a predetermined number of the features, said predetermined number representing said time block.

26. The system according to claim 25, wherein said distance calculating unit extracts the features simultaneously when the input pattern memory stores the features.

27. The system according to claim 26, wherein said distance calculating unit accesses the input pattern memory only after the input pattern memory stores a last feature of the predetermined number of the features.

28. The system according to claim 25, wherein a number of accesses required by said distance calculating unit to access said standard pattern memory is (I×K)/(IL), where I is an integer and is a number of frames of said plurality of frames, K is an integer representing a total number of subword standard patterns stored in said standard pattern memory, and IL is a predetermined number of features of the plurality of frames.

29. A speech recognition system, comprising:

an analyzing unit for receiving a sound, sequentially dividing the sound into a plurality of frames, and converting each of the frames sequentially to first data;

an input pattern memory for sequentially storing the first data;

a distance calculating unit for reading a predetermined number of the first data from said input pattern memory;

a standard pattern memory for storing second data, said distance calculating unit for reading one of said second data, and for calculating first distances between each of the predetermined number of the first data and the one of the second data; and a judging unit for judging a word representing the sound based on the first distances, wherein said distance calculating unit extracts the features of the analyzed data when the input pattern memory stores a predetermined number of the features, said predetermined number representing a time block.

30. The system according to claim 29, wherein said distance calculating unit extracts the features simultaneously when the input pattern memory stores the features.

31. The system according to claim 30, wherein said distance calculating unit accesses the input pattern memory only after the input pattern memory stores a last feature of the predetermined number of the features.

32. The system according to claim 29, wherein a number of accesses required by said distance calculating unit to access said standard pattern memory is $(I \times K)/(IL)$, where I is an integer and is a number of frames of said plurality of frames, K is an integer representing a total number of subword standard patterns stored in said standard pattern memory, and IL is a predetermined number of features of the plurality of frames.

* * * * *